US008880449B2

(12) United States Patent
Dasdan et al.

(10) Patent No.: US 8,880,449 B2
(45) Date of Patent: Nov. 4, 2014

(54) METHODS AND APPARATUS FOR COMPUTING GRAPH SIMILARITY VIA SIGNATURE SIMILARITY

(75) Inventors: Ali Dasdan, San Jose, CA (US); Panagiotis Papadimitriou, Stanford, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1511 days.

(21) Appl. No.: 12/236,682

(22) Filed: Sep. 24, 2008

(65) Prior Publication Data
US 2009/0150381 A1 Jun. 11, 2009

Related U.S. Application Data

(63) Continuation of application No. 11/951,172, filed on Dec. 5, 2007, now Pat. No. 8,019,708.

(51) Int. Cl.
*G06N 5/00* (2006.01)
*G06F 1/00* (2006.01)
*G06F 17/30* (2006.01)

(52) U.S. Cl.
CPC .............................. *G06F 17/30864* (2013.01)
USPC ............................... 706/45; 714/25; 707/706

(58) Field of Classification Search
USPC .......................................................... 706/45
See application file for complete search history.

(56) References Cited

U.S. PATENT DOCUMENTS

2008/0097980 A1* 4/2008 Sullivan ............................ 707/5
2008/0275902 A1* 11/2008 Burges et al. ................. 707/102
2008/0313119 A1* 12/2008 Leskovec et al. ............... 706/46

OTHER PUBLICATIONS

Detecting Near-Duplicates for Web Crawling, Manku, Jain and Sarma, www May 8-12, 2007, Banff, Alberta, Canada, pp. 141-149.*

* cited by examiner

Primary Examiner — Jeffrey A Gaffin
Assistant Examiner — Kalpana Bharadwaj
(74) Attorney, Agent, or Firm — James J. DeCarlo; Greenberg Traurig, LLP

(57) ABSTRACT

This disclosure describes systems and methods for identifying and correcting anomalies in web graphs. A web graph is transformed into a set of weighted features. The set of weighted features are then transformed into a signature via a SimHash algorithm. The signature is compared to the signature of one or more other web graphs in order to determine similarity between web graphs. Actions are then carried out to remove anomalous web graphs and modify parameters governing web mapping in order to decrease the likelihood of future anomalous web graphs being built.

11 Claims, 7 Drawing Sheets

METHODS AND APPARATUS FOR COMPUTING GRAPH SIMILARITY VIA SIGNATURE SIMILARITY

CROSS REFERENCE TO RELATED APPLICATION

This application is a continuation of application Ser. No. 11/951,172, filed Dec. 5, 2007 now U.S. Pat. No. 8,019,708 entitled METHODS AND APPARATUS FOR COMPUTING GRAPH SIMILARITY VIA SIGNATURE SIMILARITY.

BACKGROUND

Web graphs are approximate snapshots of the web, created by search engines. The evolution of the web can be monitored via monitoring web graphs. Web graphs also enable global web properties such as PAGERANK™, from GOOGLE®, to be computed where PAGERANK™ is a score assigned to a web page based on the importance of that web page. The importance of a web page is determined by the importance of the other web pages that hyperlink to the web page. Monitoring web graphs also provides a means to monitor the effectiveness of search engines and web crawlers or web spiders.

Web graphs are composed of nodes connected by edges. Nodes represent web pages and can be associated with one or more properties for the node's web page such as PAGERANK™, domain level quality, and scores relating to spam, and the level of adult content among others. Edges represent the hyperlinks between web pages and can be associated with one or more properties such as the PAGERANK™ of the web page from which an edge originates

SUMMARY

This disclosure describes systems and methods for identifying and correcting anomalies in web graphs. One aspect of the disclosure comprises a method comprising selecting a first web graph; transforming the first web graph into a first set of weighted features; transforming the first set of weighted features into a first signature via a SimHash algorithm; selecting a second web graph; transforming the second web graph into a second set of weighted features; transforming the second set of weighted features into a second signature via the SimHash algorithm; computing the similarity between the first and second signatures; and initiating web mapping based on the similarity between the first and second signatures.

Another aspect of the disclosure comprises a system comprising a crawler module that collects data about a plurality of web pages from a web crawler; a web graph module for selecting one or more web graphs; a set of features generation sub-module for transforming the one or more web graphs into one or more sets of weighted features; a SimHash algorithm sub-module for transforming the one or more sets of weighted features into one or more signatures via a SimHash algorithm; a signature similarity sub-module for computing the similarity between the one or more signatures; and a web mapping sub-module for initiating web mapping based on the similarity between the one or more web graphs as computed by the signature similarity sub-module.

Yet, another aspect of the disclosure comprises a computer readable media having computer-readable instructions tangibly stored thereon, the computer-readable instructions, when executed by a computer comprising: selecting a first web graph; selecting a first feature from the first web graph; identifying first feature data for the first feature; adding the first feature data to a first set of weighted features; transforming the first set of weighted features into a first signature via a SimHash algorithm; selecting a second web graph; selecting a second feature from the second web graph; identifying second feature data for the second feature; assigning the second feature data to a set of weighted features; transforming the second set of weighted features into a second signature via the SimHash algorithm; computing the similarity between the first and second signatures; and initiating web mapping based on the similarity between the first and second signatures.

These and various other features as well as advantages will be apparent from a reading of the following detailed description and a review of the associated drawings. Additional features are set forth in the description which follows, and in part will be apparent from the description, or can be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of systems and methods described below and are not meant to limit the scope of the disclosure in any manner, which scope shall be based on the claims appended hereto.

DETAILED DESCRIPTION

Figure 1:
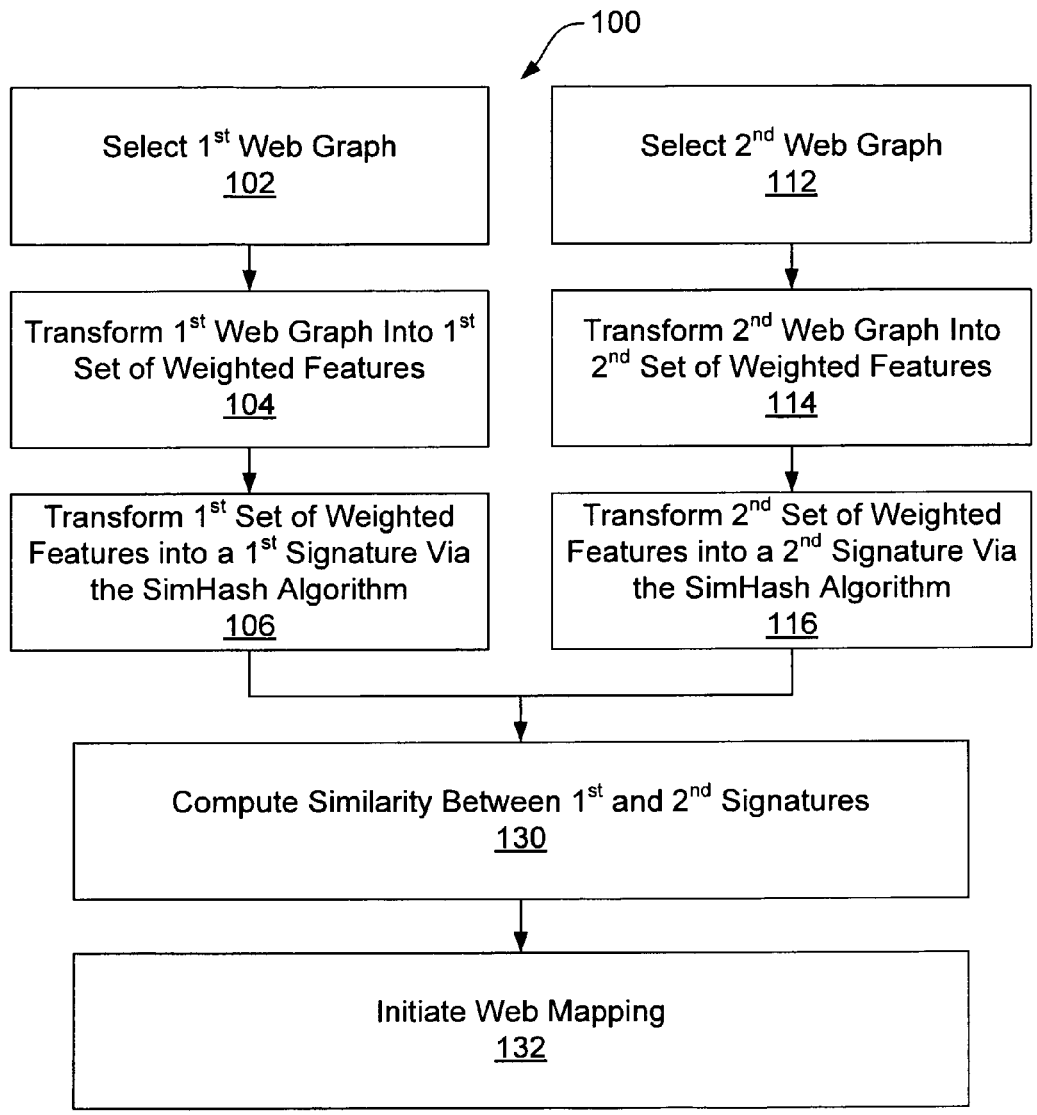
FIG. 1 illustrates a method for determining the similarity between two web graphs and initiating web mapping based on the similarity.

For the purposes of this disclosure a computing device includes a processor and memory for storing and executing program code, data and software. Computing devices can be provided with operating systems that allow the execution of software applications in order to manipulate data. Servers, personal computers, PDAs, wireless devices, cell phones, internet appliances, media players, home theater systems, and media centers are several non-limiting examples of computing devices.

For the purposes of this disclosure, a web page comprises a document that can be retrieved from a computing device. Other commonly-understood terms used to describe a web page include a document, web document, or internet document. A web page can be an HTML document or a non-HTML document such as a portable document format document (pdf). Web pages can be accessed from a computing device such as a server and can be accessed via a network. A web page can be viewed over the World Wide Web via a web browser. Web pages can be identified via a Uniform Resource Locator (URL) or a Universal Resource Identification (URI). Aggregations of web pages sharing a common domain are collectively referred to as a web site.

For the purposes of this disclosure a computer readable medium stores computer data in machine readable form. By way of example, and not limitation, a computer readable medium can comprise computer storage media. Computer storage media includes, but is not limited to, volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computing device.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules.

For the purposes of this disclosure an engine is a software, hardware, or firmware (or combinations thereof) system, process or functionality that performs or facilitates the processes, features, and/or functions described herein (with or without human interaction or augmentation). A search engine, by way of non-limiting example, can accept search criteria, such as search terms and dates of publication, query a network for web pages meeting the search criteria, and return query results. An engine could, for example, include modules, or an engine could be a module or component of a larger system.

For the purposes of this disclosure a web graph is a series of nodes and edges that represents the web, or a portion thereof. Nodes represent web pages, web hosts, and/or web domains while edges represent directional hyperlinks between web pages. The term features can be used to refer to either nodes or edges. Edges can be directional; in other words they represent directional hyperlinks. A user on a first node (web page) can access a second node (web page) via an edge (hyperlink), but cannot return to the first node via the same edge. A second edge with the opposite direction to the first edge can be used to directly access the first node from the second node. Although nodes can represent web pages, web hosts, and/or web domains, for clarity this disclosure assumes that nodes are web pages. Such reference is not to be taken as limiting.

Nodes can be associated with two types of data: properties and quality. Properties can include, but are not limited to, one or more of the following: name, content, inlinks, or outlinks. A name can be any string that represents or identifies the node. For instance, a name can be a universal resource locator. Alternatively, a name can be letters, "A" or "BB" for example. Alternatively, a name can comprise a string of numbers such as "000101," numbers and symbols such as "19@4*5," numbers and letters such as that seen in hexadecimal numbers like "C9BCE0F5," or any combination of one or more of the following: letters, numbers, symbols. Content can include, but is not limited to, categories for nodes such as "News," "Entertainment," or "Adult Media." Inlinks are the links that point to a given node, and outlinks are nodes that point out from a given node. For instance, assuming a starting node A, where A has a directional edge pointing towards node B, node A is outlinked to node B. The outlink is the edge pointing from node A to node B. Alternatively, if node B has an edge pointing towards reference node A, then B is inlinked to reference node A and the edge is the inlink. A node can have zero or more inlinks and outlinks.

Quality or quality score represents information or values associated with nodes and edges. One example of quality is a node's PAGERANK™. Quality can also comprise, but is not limited to, one or more of the following node characteristics: time of creation, time of last modification, time of identification by a web crawler, number of visitors, click count, view count (a score for the number of times that a node is viewed whether or not that node is selected via clicking of a mouse), ad count (a score for the number of times that a node is associated with advertisements), ad revenue (a measure of advertising revenue that a node brings in based on its ad count), number of unique pages (for host or domain nodes), percentage of unique pages (for host or domain nodes), number of duplicate pages (for host or domain nodes), and/or percentage of duplicate pages (for host or domain nodes). Quality can also comprise scores for such things as amount and quality of spam, porn, news, entertainment, media, and other content categories. Quality can comprise any of the above-named elements, in any combination, and weighted in any fashion. For example, machine learning can be used to compute a weighted quality derived from any one or more of the above-name elements. Furthermore, quality may comprise scores specific to certain types of nodes. For instance, HostRank and DomainRank are scores assigned to web graphs of hosts and domains respectively.

Edges can similarly be associated with two types of data: properties and quality. Properties can comprise the names of the two nodes that an edge connects. For example, if an edge directionally connects the node A to B, then the edge can comprise the name AB. Edge properties can also comprise, but are not limited to: weight, anchortext (the text of a hyperlink), and destination pages. In an embodiment, edges can comprise the same quality as the node from which they originate. Alternatively, edges can comprise a quality that is different from the node from which they originate. For instance, edges can comprise the quality of the node from which they originate normalized by the number of outlinks from that node.

Systems and methods are herein disclosed for both determining the similarity between web graphs and initiating web mapping based on the similarity between web graphs. One application of computing the similarity between a first and second web graph is to identify anomalies. An anomaly indicates that a web graph contains significant differences from the web graph that it is compared to. In some instances it can be desirable to remove the anomalous web graph from a database of web graphs, or to ignore the web graph during analysis. For instance, an anomaly can result when two web graphs do not share many common hosts. The more recently built web graph can be missing a significant number of hosts because something went wrong during the web crawl or the web graph building. As such, the web can be recrawled and a new web graph built in order to replace the anomalous web graph. The anomalous web graph can either be removed from the database of prior web graphs or can remain in the database but be ignored during operations that analyze the set of web graphs.

At the same time, it can be desirable to attempt to prevent crawling that results in anomalous web graphs. This can be accomplished by modifying the parameters governing web crawling and web building. For instance, one purpose of mapping the web is to monitor changes in the web. If the web is changing rapidly, then two consecutively-built web graphs can miss details of the changing web. This can result in an anomaly. To ensure that subsequent web graphs better track the changes in the web subsequent the frequency with which the web is crawled and web graphs are built can be increased so that subsequent web graphs better track the changes in the web.

The frequency of web crawling and web graph building can be unnecessarily high in some situations such that two web graphs are too similar. This is a second type of anomaly and indicates that the web is changing so slowly that more crawls and web graph builds are being performed than is necessary to track the changes in the web. Such inefficient use of resources can be avoided by lowering the frequency of crawls and web graph builds.

FIG. 1 illustrates a method for determining the similarity between two web graphs and initiating web mapping based on the similarity. The method can begin with a selection operation 102 wherein a first web graph is selected. Selection can include extracting a first web graph from a database or accessing a first web graph from a database. Selection can include retrieving a web graph from a server or another system for storing data. In one embodiment, selection can include determining an address where the web graph resides and providing this address to the next operation in the method for subsequent web graph retrieval or access. A web graph can be selected in order to compare it to a second web graph. The selection operation 102 can take place after the first and second web graph have been created. In one embodiment, the first web graph can be selected after the first web graph has been created, but before the second web graph has been created.

Figure 7:
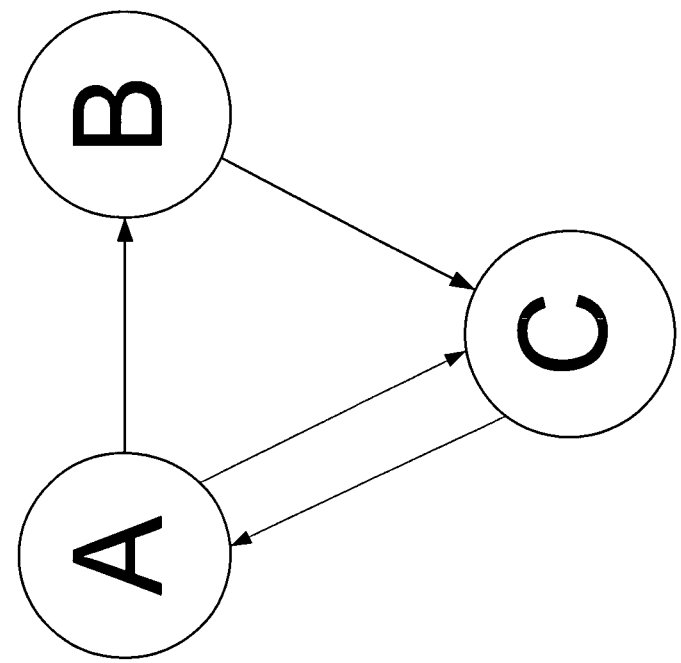
FIG. 7 illustrates an embodiment of a web graph as discussed in the embodiments of FIGS. 5 and 6.

Once a first web graph is selected it can be transformed into a first set of weighted features via the transform operation 104. The details of this operation will be discussed with reference to FIG. 4 and FIG. 5. To understand operation subsequent to operation 104 it is instructive to consider an example web graph as illustrated in the web graph shown in FIG. 7.

The web graph discussed above, and illustrated in FIG. 7, has three nodes named A, B, and C, and four edges names AB, AC, BC, and CA. As previously mentioned, node names and edge names can both be referred to as features. In an embodiment, the node quality scores are equal to each node's PAGERANK™, although other values can also be used to derive quality. The quality score for an edge can comprise the quality of the node from which the edge originates from, normalized by the number of outlinks from the originating node. For example, the edge AB has a quality 1.4 which is equal to the originating node A. Since node A has two outlinks (to nodes B and C) the quality of node A is normalized by ½ giving edge AB's quality as 1.4*½ or 0.7. Other techniques for normalizing edges is also envisioned. For instance, normalization could be performed using the ratio of outlinks to inlinks for a given node.

The transform operation 104 can produce a set of weighted features, referred to as L1, from this imaginary web graph such as the following:

$L1=[(A,1.4),(B,2.1),(C,0.5),(AB,0.7),(AC,0.7),(BC,2.1),(CA,0.5)]$

Each element of L1 contains either a node name or an edge name, and its weight, which is the quality score for that feature. For instance, the first element of L1 comprises the node name for feature A and the quality score for feature A (A,1.4). The fourth element of L1 comprises the edge name for feature AB and the quality score (normalized) for feature AB (AB,0.7).

The first set of weighted features L1 can be transformed into a first signature S via a SimHash algorithm in the operation 106. The SimHash algorithm (referred to as SimHash) can apply a hash function to each feature of L1 such that each feature is transformed into a b-dimensional digest. The variable b can be an empirically-derived fixed number that is the same for all features. For instance, if b=4, the hash of feature "A" can be a 4-dimensional digest such as (0001). The set of transformed features make up an n-dimensional vector referred to as L2. The variable n is equal to the number of distinct features in the web graph. For instance, in the example web graph above there are seven distinct features so n=7. Hashing the example set of weighted features L1, and assuming b=4, the resulting 7-dimensional vector L2 would be given as follows (these digests are imaginary results and are not derived from a real hash function):

$L2=[(0001),(0010),(0100),(0011),(0101),(0110),(1000)]$

Digests can be represented in binary, hexadecimal, or any other format. For instance, the MD4 and MD5 hash algorithms typically produce hexadecimal digests.

Each "1" in a digest can be set equal to the quality for that digest's feature, and each "0" in a digest can be set equal to minus the quality for that digest's feature. This can produce a vector referred to as L3. Applying this step to the example vector L2 would give the vector L3 as follows:

$L3=[(-1.4 -1.4 -1.4\ 1.4),(-2.1 -2.1\ 2.1 -2.1),(-0.5\ 0.5 -0.5 -0.5),(-0.7 -0.7\ 0.7\ 0.7),(-0.7\ 0.7 -0.7 -0.7),(-2.1\ 2.1\ 2.1 -2.1),(0.5 -0.5 -0.5 -0.5)]$

Digests can be summed to form a single b-dimensional vector referred to as L4. In the example, L4 would be given as follows:

$L4=[-7 -1.4\ 1.8 -3.8]$

The L4 vector can be converted to a binary signature S by substituting the value 1 for every positive element in the vector L4, and substituting the value 0 for every negative element in the vector L4. In the example the signature S would be given as follows:

$S=[0\ 0\ 1\ 0]$

In an embodiment, the vector L4 can be transformed into a hexadecimal signature or some other numerical format. Also, identical operations 112, 114, 116 to those described above take a second web graph, and transform it into a second signature referred to as S'.

The similarity between signature S and signature S' can be computed in a computation operation 130 using the Hamming distance of the bits of S and S'. For instance, the Hamming distance between S=[0 0 1 0] and S'=[0 1 1 1] is equal to 2, which is the number of bit positions for which the corresponding bits are different. The similarity between S and S' is then equal to 0.5 (Hamming Distance/Number of Bits in S or S'). In other embodiments, the signatures can be represented in other number bases such as hexadecimal or decimal. When non-binary bases are used, other methods for determining the similarity between signatures can be used. For instance, the Cosine between two signature vectors or the Euclidean distance between the signature vectors can be used.

Once the similarity between a first and second web graph has been computed the method 100 initiates web mapping via an initiate web mapping operation 132. This web mapping 132 is based upon the results of the similarity computation operation 130. In an embodiment, web mapping entails instructing a web crawler to crawl the web identifying web pages and collecting data about those web pages and the outlinks from the web page to other web pages. Collected data can be used to calculate quality values such as PAGER-ANK™ and HostRank and to build web graphs.

Figure 2:
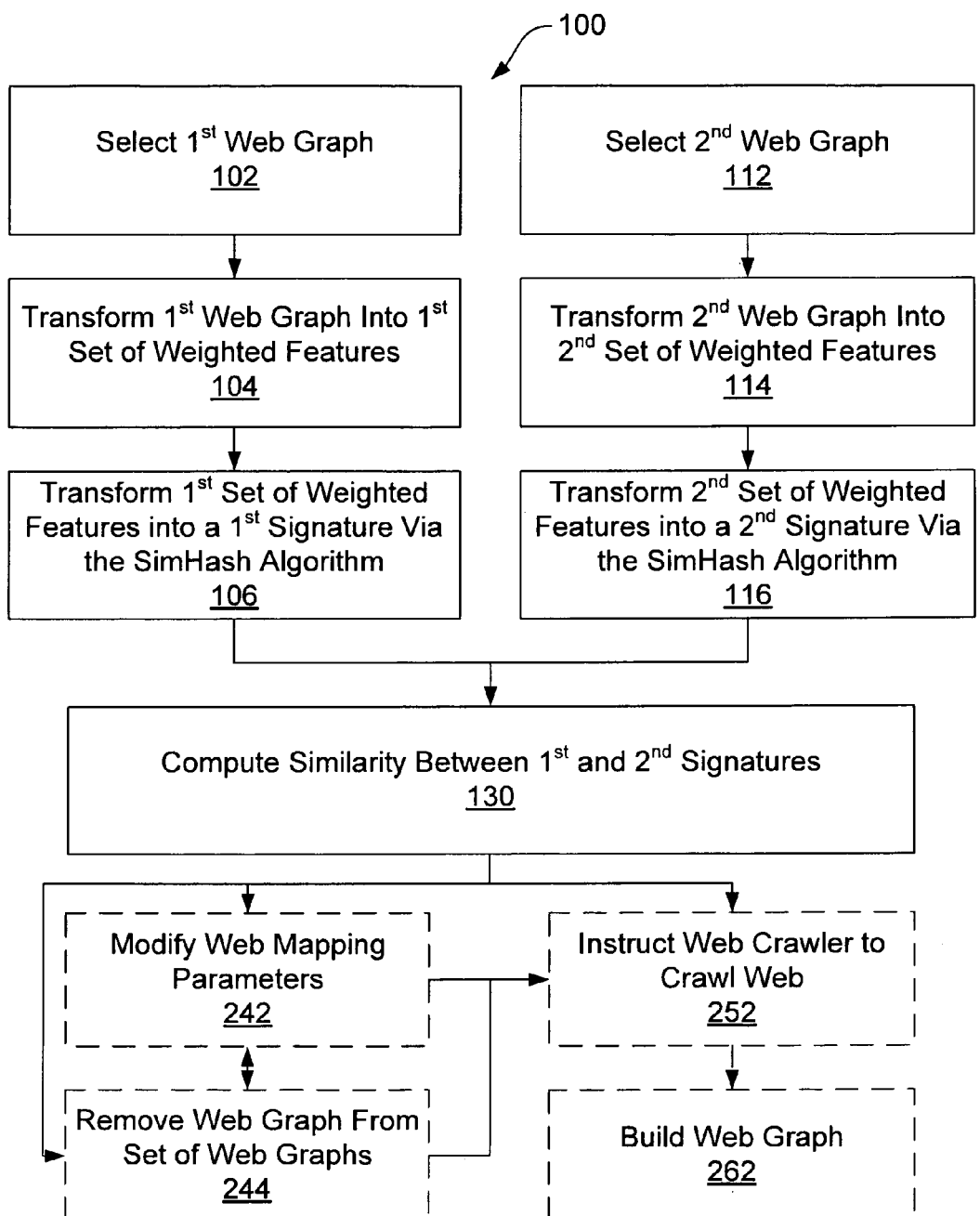
FIG. 2 illustrates the method of FIG. 1 with embodiments of initiating web mapping.

FIG. 2 illustrates an embodiment wherein initiating web mapping comprises instructing a web crawler to crawl the web in an instruction operation 252, and further comprises building a web graph from the results of the crawl in a build operation 262. These operations 252, and 262 can or can not execute every time that the method 100 executes. For instance, when an anomaly is not identified, the operation 252 and 262 cannot execute. In another embodiment, the instruction operation 252 can execute, but the build web graph operation 262 can not immediately execute. Rather, the data from the web crawl can be stored and the web graph can be built at a later time.

The instruction to the web crawler can instruct the crawler to immediately crawl the web, instruct the crawler to crawl the web at a specified later time, or can instruct the crawler to delay a specified amount of time before crawling. For example, if the similarity computation operation 130 indicates that an anomalous web graph was recently built, then the instruct operation 252 can instruct a web crawler to immediately begin crawling the web. From the data collected during this crawl a new web graph can be built to replace the anomalous web graph.

In an embodiment, web mapping can comprise modifying parameters that govern web crawling and web graph building. Such an embodiment is illustrated by a modify web mapping parameters operation 242 in FIG. 2. In an embodiment, a parameter can be the speed with which a web crawler crawls the web. For instance, a web crawler that collects a large amount of data about each web page visited will more slowly crawl the web than a web crawler that collects a small or more targeted amount of data bout each web page visited.

Figure 3:
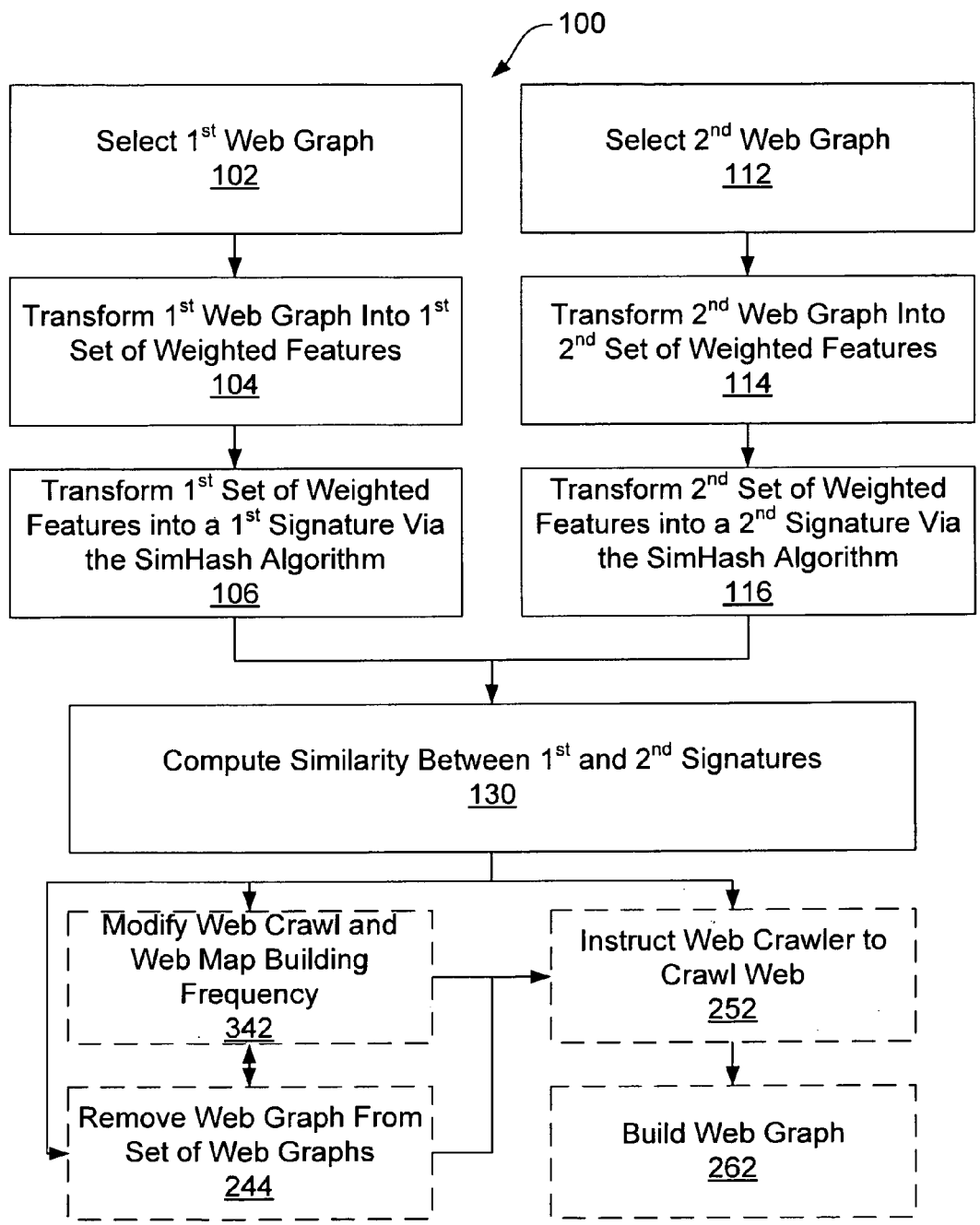
FIG. 3 illustrates the method of FIG. 2 with an embodiment of modifying parameters of web mapping.

In an embodiment, the frequency with which a web crawler crawls the web is a parameter that can be modified, as illustrated in FIG. 3. This is done in the modify operation 342. In another embodiment, the frequency with which a web graph is built from data collected by a web crawler is a parameter that can be modified. In an embodiment, both the frequency with which a web crawler crawls the web and the frequency with which a web graph is built can be modified.

The frequency with which the web is crawled and with which web graphs are built can increase or decrease. In an embodiment, this modification can be proportional to the similarity computed in the computation operation 130. Alternatively, the frequency can be modified using an algorithm that converts the similarity computed in operation 130 into a unit of increment/decrement that is applied to the frequency.

In an embodiment, initiating web mapping 132 can comprise removing one or more web graphs from a set of web graphs as illustrated by the remove operation 244 of FIG. 2. Removing a web graph can entail deleting the web graph from a set of web graphs stored in a database. For instance, web graphs can be built on a daily basis creating a set of web graphs. A web graph built on Tuesday can be found to be anomalous as compared to Monday's web graph. As a result, the removal operation 244 can remove the Tuesday web graph from the set of web graphs. Removing a web graph can alternatively entail ignoring the web graph in subsequent analyses of the set of web graphs. For instance, the anomalous web graph can be disassociated with the web graph set such that analyses do not recognize the anomalous web graph as being a part of the set. Or the anomalous web graph may be moved to a location on a computer readable medium that is not accessed in analyses of the web graph set.

The modify operation 242 can execute when an anomaly is detected in the computation operation 130. In another embodiment the modify operation 242 can execute followed by the instruct and build operations 252 and 262. In another embodiment the modify operation 242 can execute followed by the remove operation 244, the instruct operation 252, and the build operation 262. In an embodiment, the remove operation 244 executes. It should be understood that the above listing of operation sequences is not exhaustive, and thus other combinations of one or more of the operations 242, 244, 252, and 262 can initiate as a result of the computation operation 130. Furthermore, although these embodiments are described as executing serially, they can also execute in parallel or in a combination of parallel and serial operations.

Furthermore, in an embodiment, a pre-set threshold can be used to determine when two web graphs are similar enough or dissimilar enough for one to constitute an anomaly. Alternatively, two thresholds, one for similarity and one for dissimilarity, can be used. For instance, since the similarity computation can produce results ranging from zero to one, a threshold of 0.1 and 0.9 could be selected. Results less than 0.1 or greater than 0.9 could be considered anomalous and thus initiate the web mapping operation 132.

Moreover, web graphs can be built from scratch or new data can be used to modify previously-built web graphs. For instance, if regions of the web graph that caused the anomalous result can be isolated, then the initiate web mapping operation 132 may instruct the crawler to crawl only the region of the web corresponding to this region of the web graph. The operation 132 may also initiate rebuilding of this region of the web graph rather than an entirely new web graph.

Although the operations 102, 104, and 106 acting on the first web graph can be performed in parallel with the operations 112, 114, and 116 acting on the second web graph they can also operate serially. In an embodiment, those operations 102, 104, and 106 dealing with the first web graph can be performed initially followed by the operations 112, 114, and 116 performed on the second web graph. In an embodiment, the sequence of operations for a first web graph or a second web graph can be performed on a plurality of web graphs simultaneously. In such an embodiment, the similarity between one or more pairs of web graphs can be simultaneously computed via the computation operation 130. For instance the similarity between a first and second web graph can be computed while the similarity between a third and fourth web graph are computed. In another embodiment, the computation operation 130 can simultaneously compute the similarity between a first web graph and multiple other web graphs. For instance, the similarity between a first and second web graph could be computed via the operation 130 while at the same time the operation 130 could compute the similarity between a first and third web graph.

In an embodiment, the initiate web mapping operation 132 can be based on multiple similarity computation operations 130. For instance, the computation operation 130 can compare the similarity between web graphs that have been created over a period of time such as a week. As such, the initiate web mapping operation 132 can be based on similarity computations computed on a week's sequence of web graphs rather than just a single similarity computation between two consecutive web graphs.

In another embodiment, the computation operation 130 can be used to identify anomalous web graph trends. For instance, assume that three web graphs are built each day from three web crawls taking place in the morning, midday, and evening. If the similarity between web graphs over a period of weeks shows consistent anomalies during evenings, this could indicate that the web is being crawled less frequently in evenings than is necessary to capture those changes. As such, the initiate web mapping operation 132 can increase the frequency with which the web is crawled and web graphs are built during evenings.

Figure 4:
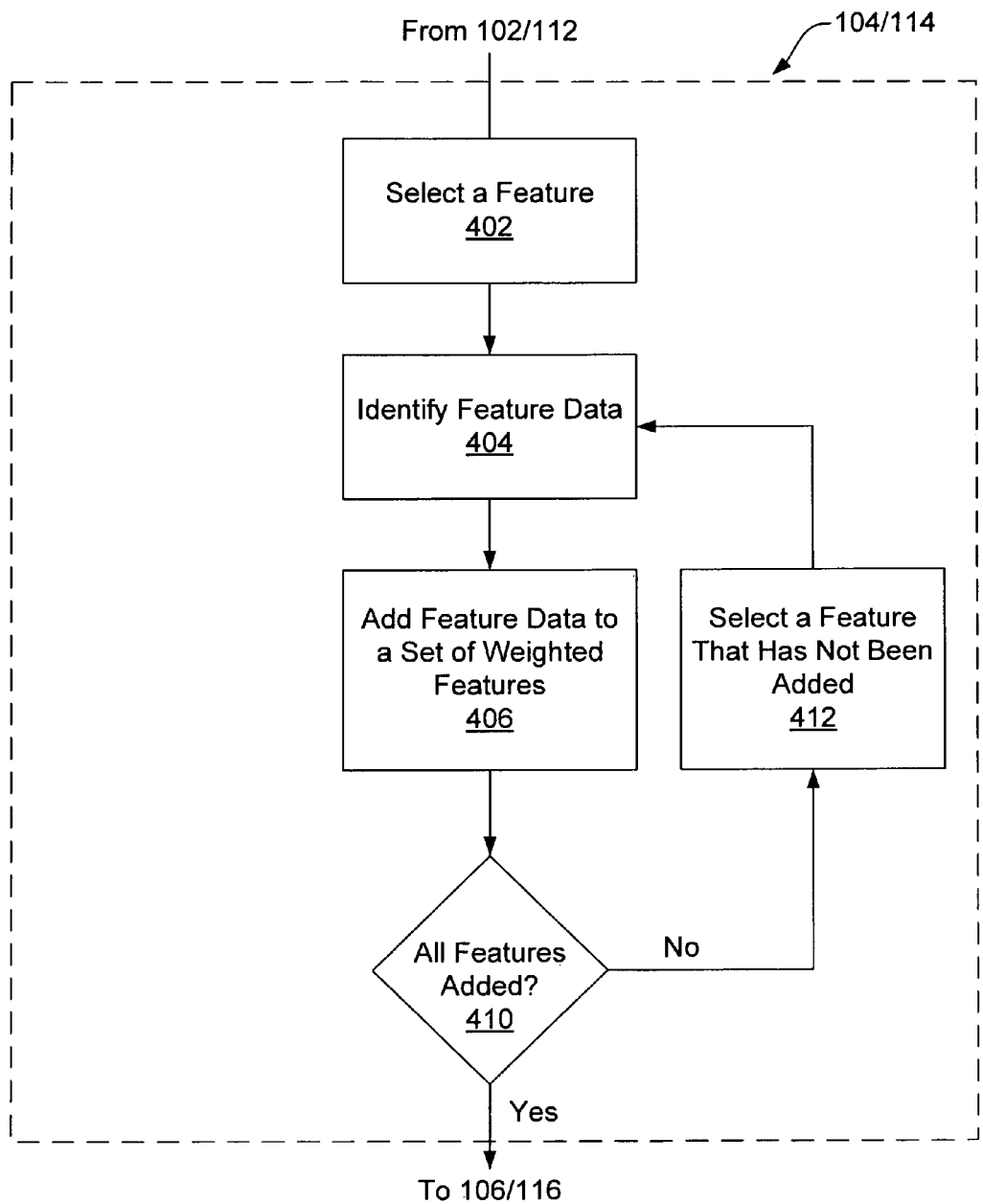
FIG. 4 illustrates a method for transforming a web graph into a set of weighted features where features can be either nodes or edges.

FIG. 4 illustrates a method for transforming a web graph into a set of weighted features where features can be either nodes or edges. Once the web graph has been selected via the selection operation 102/112, the transformation operation 104/114 can begin by selecting a feature in a selection step 402. Any feature in the web graph can be selected and the order of selection is not important.

Once a feature is selected, the feature data can be identified in an identify step 404. Feature data can comprise properties and quality of nodes and edges. For instance, feature data can comprise, but is not limited to, the name of a node and the node's PAGERANK™ Features can be associated with more data than is needed, and as such identifying data can comprise identifying only certain types of feature data. For instance, the PAGERANK™ for a node can be identified even though the node is associated with PAGERANK™ as well as the potential quality score for the number of outlinks and inlinks for the node. In another instance, the PAGERANK™, ad count, and ad revenue for a node can be identified even though the node is associated with a number of potential quality scores including PAGERANK™, ad count, ad revenue, click count, view count, number of unique pages, and number of duplicate pages.

Having identified feature data, an add feature data step 406 can add an element to a set of weighted features, where the element comprises the feature and its corresponding weight. For instance, a feature can be selected, and the name identified as "A" and the quality identified as 1.4. The add step 406 would then add an element with these two values to the set of weighted features L1 as follows:

$$L1=[(A,1.4)]$$

The operation 104/114 can then determine if all features in the web graph have been added to the set of weighted features in a determination 410. If it is determined that all features have been added, then the transform operation 106/116 can initiate. However, if all features have not been added, then a feature that has not been added is selected in the selection step 412. Once feature that has not been added is selected, the identify step 404, assign step 406, and selection step 412 repeat until all features have been added to the set of weighted features. Thus, as the web graph is transformed the size of the set of weighted features L1 will grow one larger for each feature that is added to it. Ultimately, the size of the set of weighted features should be equal to the number of distinct features in the web graph. In an embodiment, not all features in the web graph can be selected, identified, and added, and as such the size of L1 can be less than the number of distinct features in the web graph.

The illustrated embodiment treats nodes and edges equivalently, and as such all features are serially treated. However, in another embodiment, parallel 104/114 operations can transform features into a set of weighted features simultaneously.

Figure 5:
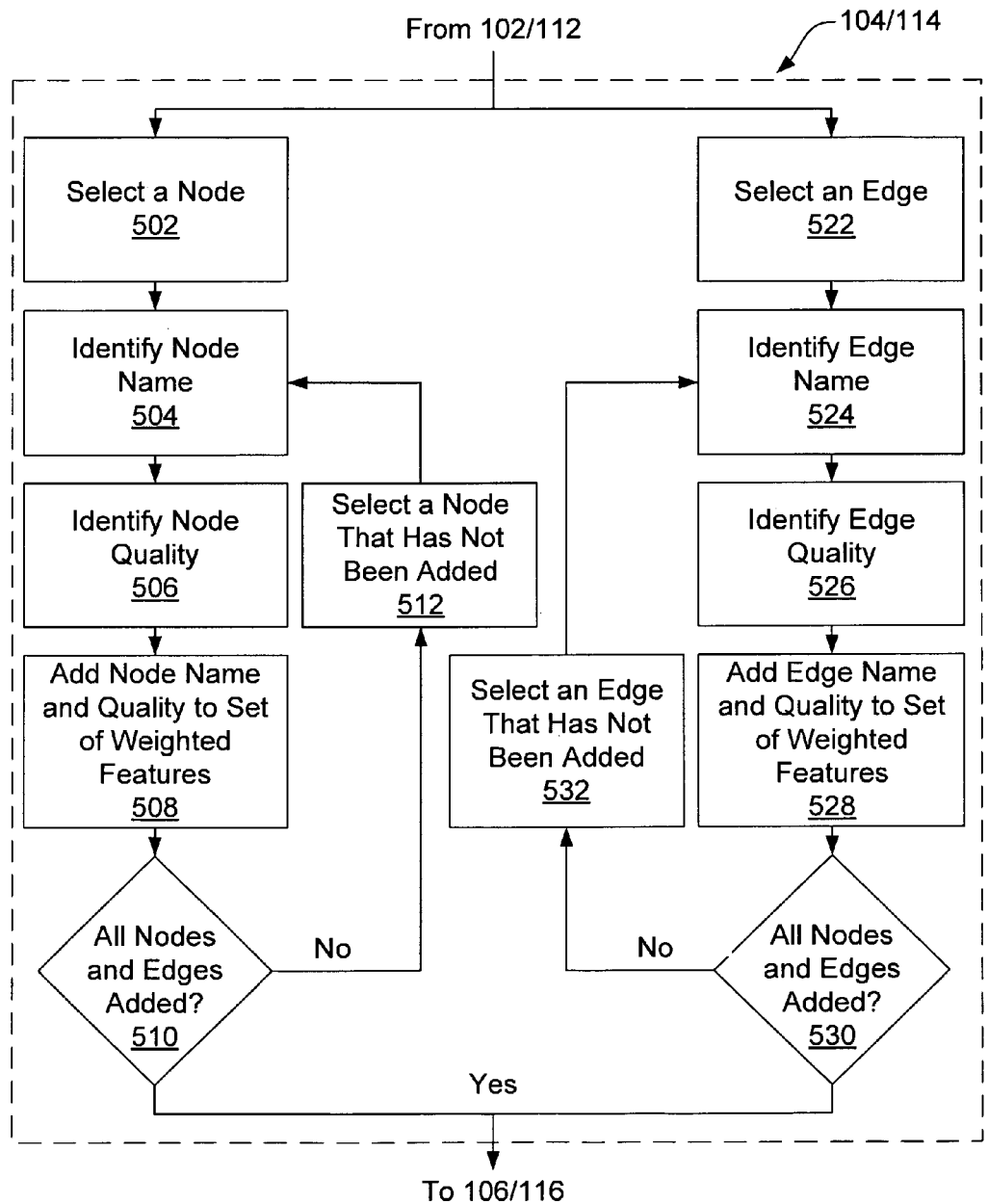
FIG. 5 illustrates a method for transforming a web graph into a set of weighted features where features can be either nodes or edges.

Alternatively, nodes and edges can be treated separately allowing each to be treated in parallel as illustrated in FIG. 5. Once the web graph is selected via the selection operation 102/112, the transformation operation 104/114 can select an edge and a node via the respective selection steps 502 and 522. Any node or edge in the web graph can be selected and the order of selection is not important.

The node process is first described, followed by the parallel process for edges. Once a node is selected, the node name can be identified in an identify step 504. Having identified the node name, an identify node quality step 506 identifies the quality for the node. Both values can be added as an element to a set of weighted features in the add step 508. The name can be the value of the element, and the quality can be its corresponding weight. For instance, a node can be selected named "A" and having a quality 1.4. The add step 508 could add a new element comprising these two values to the set of weighted features L1 as follows:

$$L1=[(A,1.4)]$$

Once the node name with its quality as a weight is added to L1, the determination 510 determines if all nodes and edges have been added. If they have, then the transform operation 106/116 initiates. However, if not all nodes and edges have been added, then a select node that has not been added step 512 selects one of the nodes that has not been added. The node name and quality are then identified and added to L1. This process repeats until all nodes and edges have been added to L1.

The steps associated with edges are similar to those for nodes. Once an edge is selected, the edge name can be identified in an identify step 524. Having identified the edge name, an identify edge quality step 526 identifies the quality for the edge (which is normalized by the number of outlinks). The edge name with edge quality as a weight can be added to L1 in the add step 528. The name can be the value of the element, and the quality can be the weight of the element. For instance, an edge can be selected named AB where the node A has a quality 1.4 with a normalization factor ½ or 0.5, and thus the edge AB has a quality 0.7. The add step 528 would then add the name and quality as a weighted element to the set of weighted features L1 as follows:

$$L1=[(A,1.4),(AB,0.7)]$$

Once the edge name and quality are added to L1, the determination 530 determines if all nodes and edges have been added. If they have, then the transform operation 106/116 initiates. However, if not all nodes and edges have been added to L1, then a select node that has not been added step 532 selects one of the edges that has not been added. The edge name and quality are then identified and added to L1. This process repeats until all nodes and edges have been added.

As the web graph is transformed the set of weighted features L1 will grow for each edge that is assigned. Ultimately, the set of weighted features should have a size equal to the number of distinct features in the web graph. In an embodiment, less than the total number of features in the web graph can be selected, identified, and added, and as such the size of L1 can be less than the number of distinct features in the web graph.

Since there are usually more edges than nodes in a web graph the two parallel processes illustrated in FIG. 5 can execute at different rates or one can execute with pauses to allow the other process to catch up. It should be understood that, in an embodiment, the parallel processes for nodes and edges illustrated in FIG. 5 can operate sequentially.

Figure 6:
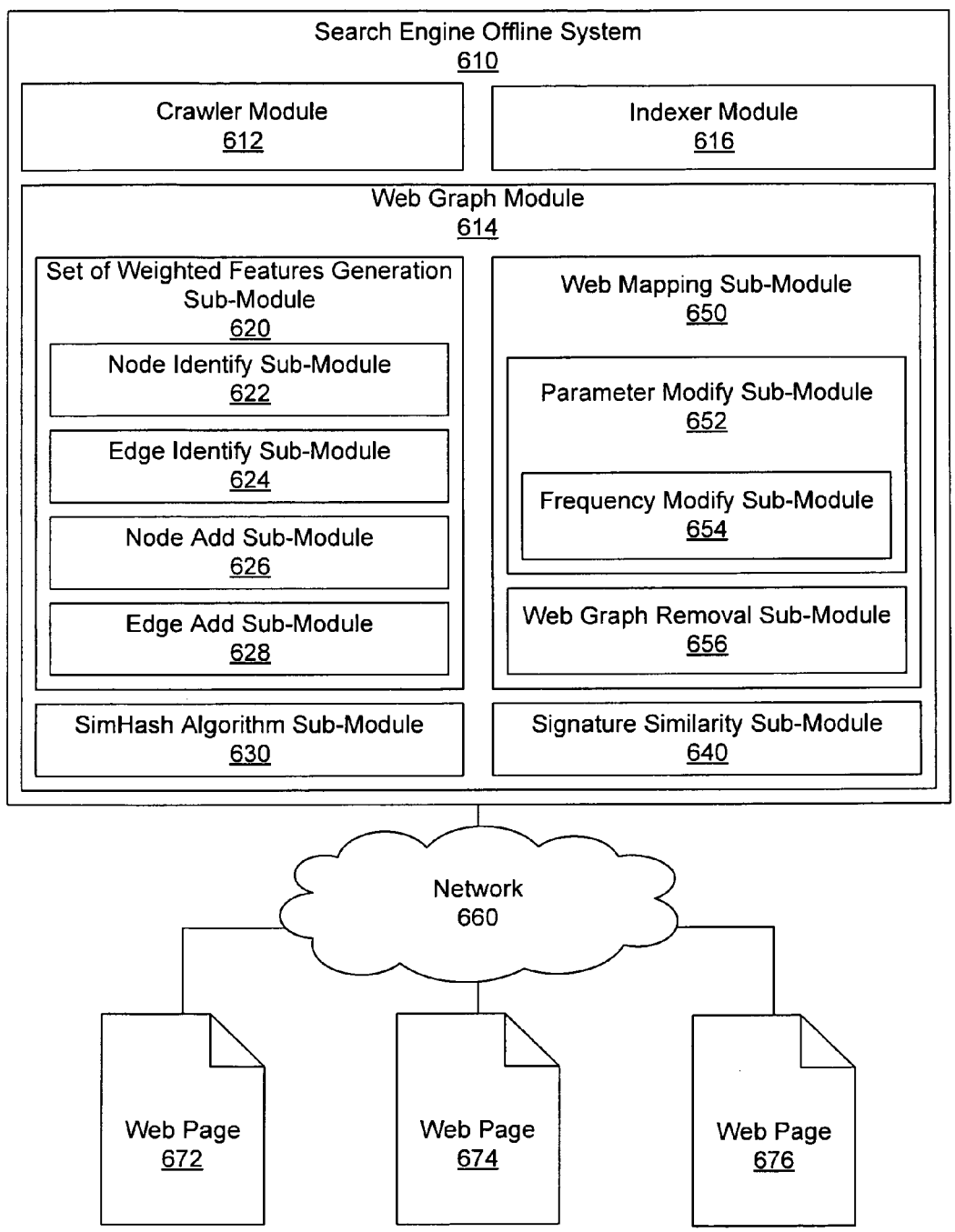
FIG. 6 illustrates a system capable of carrying out the disclosed methods.

FIG. 6 illustrates a system capable of carrying out the disclosed methods. A search engine generally has an online and offline system. The online group processes user queries in real time and returns search results. The offline system 610 collects content from web pages 672, 674, and 676 prepares it for the online group to use. In the illustrated embodiment, the offline group 610 comprises three modules: the crawler module 612, the indexer module 616, and the web graph module 614. The crawler module can comprise or instruct a web crawler to crawl the web and gather web pages and data from those web pages or identify web pages via a network 660. The web graph module 614 builds web graphs from the web pages 672, 674, and 676 and data that the crawler collects, or by accessing web pages that the crawler identified. The web graph module 614 also monitors similarity between web graphs by selecting a first and second web graph and computing the similarity between the first and second web graph. In response to finding one or more anomalous web graphs the web graph module 614 carries out operations to remove anomalies and/or modify parameters governing web mapping. The indexer module 616 indexes web pages using their content as retrieved by the web crawler. The indexer module 616 can also use the similarity as determined by the web graph module 616 to index web pages.

The web graph module 614 can comprise four sub-modules: a set of weighted features generation sub-module 620, a SimHash algorithm sub-module 630, a web mapping sub-module 650, and a signature similarity sub-module 640. The set of weighted features generation sub-module 620 transforms a web graph into a set of weighted features by means of four sub-modules: a node identify sub-module 622, an edge identify sub-module 624, a node assign sub-module 626, and an edge assign sub-module 628. These four sub-modules can operate sequentially, in parallel, or some combination of sequential and parallel. The node identify sub-module 622 identifies node names and quality. The edge identify sub-module 624 identifies edge names and quality. The node add sub-module 626 adds node names with their quality scores to the set of weighted features. The edge add sub-module 628 adds edge names with their quality scores to the set of weighted features.

The SimHash algorithm sub-module 630 applies a hash function to the features of the set of weighted features transforming them into a signature.

The web mapping sub-module 650 initiates web mapping by means of two sub-modules: a parameter modify sub-module 652 and a web graph removal sub-module 656. The parameter modify sub-module 652 modifies parameters such as the speed with which the web is crawled and web graphs are built. In an embodiment, the parameter modify sub-module 652 instructs a web crawler to crawl the web. The parameter modify sub-module 652 can also initiate building of a web graph based on the results of the aforementioned web crawl. Another parameter that can be modified is the frequency with which the web is crawled and web graphs are built. The frequency is modified by a frequency modify sub-module 654 which can be a part of the parameter modify sub-module 652. The web graph removal sub-module 656 can remove web graphs from a set of web graphs.

The signature similarity sub-module 640 can compare the signatures of two or more web graphs to determine whether an anomalous web graph exists.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure. For example, the similarity between signatures S and S' can be determined by treating both as high dimensional vectors and taking the dot product of the two vectors. The dot products of similar signatures will approach one while the dot products of dissimilar signatures will approach zero.

Numerous other changes can be made that will readily suggest themselves to those skilled in the art and which are encompassed in the spirit of the invention disclosed and as defined in the appended claims.

What is claimed is:

1. A method comprising:
   selecting, via a computing device, a first web graph;
   transforming, via the computing device, the first web graph into a first set of weighted features by at least assigning one or more quality scores to at least one feature of the first web graph, the quality scores are based on at least one score selected according to node characteristics of the first web graph;
   transforming, via the computing device, the first set of weighted features into a first signature via a SimHash algorithm;
   selecting, via the computing device, a second web graph;
   transforming, via the computing device, the second web graph into a second set of weighted features by at least assigning one or more quality scores to at least one feature of the second web graph, and wherein quality scores are based on at least one score selected according to node characteristics of the second web graph;
   transforming, via the computing device, the second set of weighted features into a second signature via the SimHash algorithm;
   computing, via the computing device, the similarity between the first and second signatures; and
   initiating, via the computing device, web mapping based on the similarity between the first and second signatures.

2. The method of claim 1 wherein quality scores are based on at least one or more characteristics selected from the group consisting of: time of creation, time of last modification, time of identification by a web crawler, number of visitors, click count, view count, ad count, ad revenue, number of unique pages, percentage of unique pages, number of duplicate pages, percentage of duplicate pages, amount of spam, quality of spam, amount of news, quality of news, amount of entertainment, quality of entertainment, amount of media, and quality of media.

3. The method of claim 1 wherein quality scores for host nodes are based on features of a host edge.

4. The method of claim 1 wherein quality scores for domain nodes are based on domain characteristics.

5. A method comprising:
selecting, via a computing device, a first web graph; transforming the first web graph into a first set of weighted features by at least assigning one or more quality scores to at least one feature of the first web graph;
transforming, via the computing device, the first set of weighted features into a first signature via a SimHash algorithm; selecting a second web graph;
transforming, via the computing device, the second web graph into a second set of weighted features by at least assigning one or more quality scores to at least one feature of the second web graph;
transforming, via the computing device, the second set of weighted features into a second signature via the SimHash algorithm;
computing, via the computing device, the similarity between the first and second signatures; and
initiating, via the computing device, web mapping based on the similarity between the first and second signatures.

6. The method of claim 5 wherein quality scores are based on node characteristics.

7. The method of claim 5 wherein quality scores are based on a host.

8. The method of claim 7 wherein quality scores for host nodes are based on features of a host edge.

9. The method of claim 7 wherein quality scores include domain characteristics.

10. The method of claim 9 wherein quality scores for domain nodes are based on features of a domain edge.

11. The method of claim 5 wherein quality scores are based on at least one or more characteristics selected from the group consisting of: time of creation, time of last modification, time of identification by a web crawler, number of visitors, click count, view count, ad count, ad revenue, number of unique pages, percentage of unique pages, number of duplicate pages, percentage of duplicate pages, amount of spam, quality of spam, amount of porn, quality of porn, amount of news, quality of news, amount of entertainment, quality of entertainment, amount of media, and quality of media.

* * * * *